United States Patent
Holt

[15] 3,659,267
[45] Apr. 25, 1972

[54] LIGHTING SYSTEMS FOR ROAD VEHICLES

[72] Inventor: William David Holt, Colne, England
[73] Assignee: Joseph Lucas (Industries) Limited, Birmingham, England
[22] Filed: Apr. 21, 1970
[21] Appl. No.: 30,560

[30] Foreign Application Priority Data
June 27, 1969 Great Britain.....................32,582/69

[52] U.S. Cl.................................................340/67, 340/81
[51] Int. Cl.................................................B60q 1/38
[58] Field of Search.......................................340/67, 73, 81

[56] References Cited

UNITED STATES PATENTS 3,244,934  4/1966  Webb..............................340/67 X
3,500,312  3/1970  Stankovich........................340/67
2,321,803  6/1943  Falge et al........................340/83

FOREIGN PATENTS OR APPLICATIONS 701,956  1/1954  Great Britain.....................340/76

Primary Examiner—John W. Caldwell
Assistant Examiner—Kenneth N. Leimer
Attorney—Holman & Stern

[57] ABSTRACT

A lighting system for a road vehicle includes front and rear flasher lamps and a pair of stop lamps. A brake switch on the vehicle serves when closed to energize the stop lamps and the rear flasher lamps, and the direction indicator switch on the vehicle serves when operative to energise the flasher lamps and the stop lamp on the side of the vehicle selected by the direction indicator switch.

1 Claims, 1 Drawing Figure

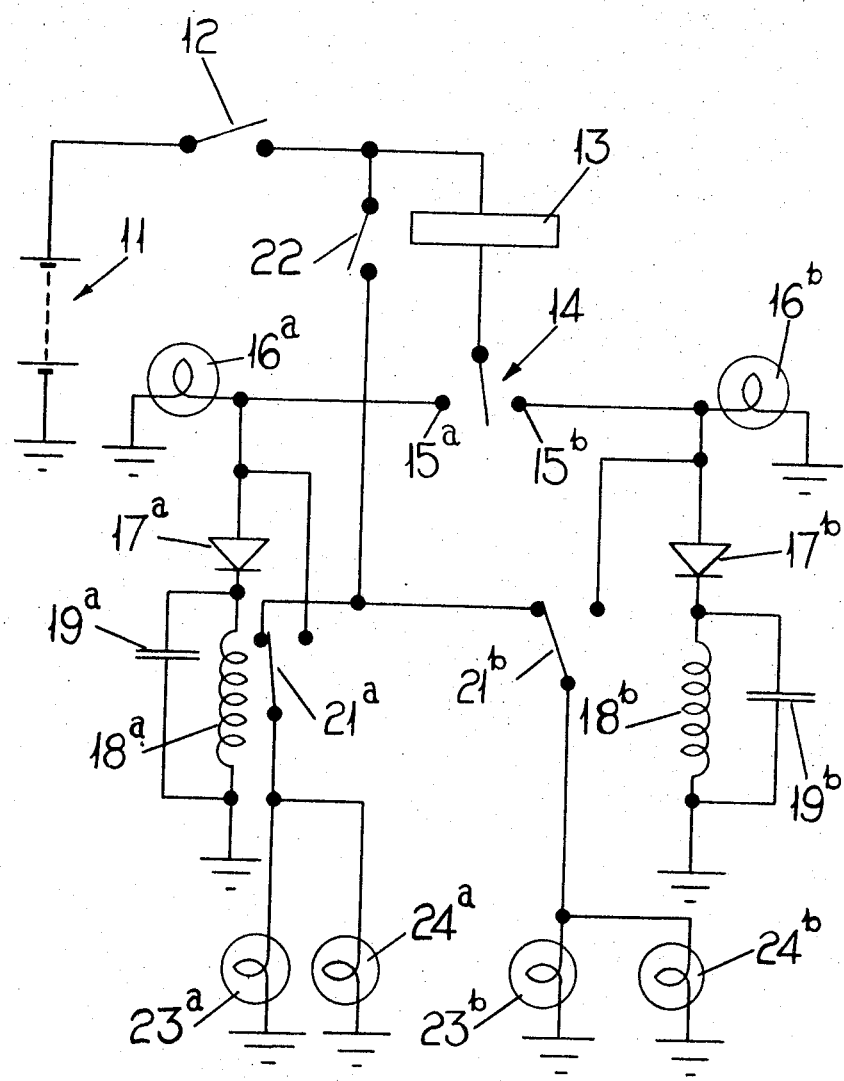

LIGHTING SYSTEMS FOR ROAD VEHICLES

This invention relates to lighting systems for road vehicles.

A system according to the invention includes left- and right-hand stop lamps at the rear of the vehicle, left- and right-hand flasher lamps at the front and rear of the vehicle respectively, the front flasher lamps being controlled by a direction indicator switch, means whereby closing of a brake switch on the vehicle energizes both rear flasher lamps as well as the stop lamps, and means whereby operation of the direction indicator switch to energize the front direction indicator lamp on one side of the vehicle also energizes the stop lamp on that side of the vehicle.

An example of the invention is illustrated in the accompanying drawing.

Referring to the drawing, the vehicle battery 11 has its negative terminal earthed and its positive terminal connected through the ignition switch 12 of the vehicle to the flasher unit 13, the output of which is connected to the movable contact of a direction indicator switch 14. The movable contact of the direction indicator switch is engageable selectively with fixed contacts 15a and 15b, the contact 15a being earthed through the left-hand front direction indicator lamp 16a, and being further connected to earth through a series circuit including a diode 17a and a relay coil 18a, the coil 18a being bridged by a capacitor 19a. The coil 18a controls a contact 21a which when the coil is de-energized completes a circuit from the battery 11 by way of the ignition switch 12, a brake switch 22 and the contact 21a to the left-hand stop lamp 23a and the left-hand rear direction indicator lamp 24a of the vehicle. However, when the coil 18a is energized, then the contact 21a couples the lamps 23a and 24a to the contact 15a.

The contact 15b is associated with a similar set of components controlling the right-hand direction indicator and stop lamps of the vehicle, and the equivalent components are marked with the same reference numerals but the suffix b.

In use, assuming that the ignition switch 12 is closed, then whenever the brakes are applied the switch 22 closes and completes circuits through the contacts 21a and 21b to energize both the stop lamps 23a and 23b, and both rear direction indicator lamps 24a and 24b. When the direction indicator switch 14 is operated, then assuming for the moment that it is desired to indicate a left-hand turn, the circuit is completed to the lamp 16a, and at the same time current flows through the diode 17a and the coil 18a to energize the coil and move the contact 21a to its alternative position, so that a circuit is completed by way of the contact 21a to both lamps 23a and 24a. However, the lamps 23b and 24b are not energized. The capacitor 19a holds the coil 18a energized during the off periods of the flasher 13, and the diode 17a prevents discharge of the capacitor except through the coil 18a. It will be seen therefore that when a left hand turn is indicated both the left-hand stop lamp and the left-hand direction indicator lamp are energized intermittently. If at the same time the switch 22 is closed, it will have no effect on the lamps 23a and 24a, but it will energize the lamps 23b and 24b continuously. Similar considerations of course apply if a right-hand turn is being indicated.

The system described is particularly useful in countries where legal requirements demand a large area of reflective surface to be illuminated for both the stop function and the direction indicator function. The circuit has the advantage that existing vehicle systems can readily be adapted by incorporation of the components 17, 18, 19 and 21 in the system. Although not shown in the circuit diagram, it is a simple matter to arrange that a switch is provided whereby the circuit can either operate in the manner described, or in the conventional manner with the direction indicator lamps and stop lamps completely isolated from one another.

Having thus described my invention what I claim as new and desire to secure by Letters Patent is:

1. A lighting system for a road vehicle, comprising in combination a battery having one terminal grounded, a direction indicator switch having a movable contact selectively engageable with first and second fixed contacts, a flasher unit, circuit means coupling said movable contact of the direction indicator switch to the battery through said flasher unit, first and second flasher lamps positioned at the left-hand side and right-hand side of the front of the vehicle respectively, third and fourth flasher lamps positioned at the left-hand side and right-hand side of the rear of the vehicle respectively, first and second stop lamps positioned at the left-hand side and right-hand side of the rear of the vehicle respectively, a circuit connection from said first contact of the direction indicator switch through said first flasher lamp to ground, a circuit connection from said second fixed contact of the direction indicator switch through the second flasher lamp to ground, a further connection between said first fixed contact of the direction indicator switch and ground, said connection including in series a first diode and a first relay winding, a first capacitor bridging said first relay winding, a first relay contact operable by said first relay winding, a brake switch on the vehicle, said brake switch being closed when the brakes of the vehicle are operated, a circuit connection from said battery through said brake switch, said first relay contact, and and then the first stop lamp and the third flasher lamp in parallel to ground, a circuit connection from said second fixed contact of the direction indicator switch to ground and including in series a second diode and a second relay winding, the second capacitor bridging the second relay winding, a second relay contact operable by said second winding, a circuit connection from the battery through the brake switch and said second relay contact, and then through the second stop lamp and fourth flasher lamp in parallel to ground, and said first relay contact serving when the first relay winding is energized to disconnect the first stop lamp and third flasher lamp from the brake switch and to connect the first stop lamp and third flasher lamp to the first fixed contact of the direction indicator switch, and said second relay contact serving when the second relay winding is energized to disconnect the second stop lamp and fourth flasher lamp from said brake switch, and to connect the second stop lamp and fourth flasher lamp to the second fixed contact of the direction indicator switch.

* * * * *